(12) United States Patent
Nakagawa et al.

(10) Patent No.: US 7,068,524 B2
(45) Date of Patent: Jun. 27, 2006

(54) GENERATOR

(75) Inventors: Yoshinori Nakagawa, Saitama (JP); Toshio Inoue, Saitama (JP); Kazufumi Muronoi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/135,451

(22) Filed: May 24, 2005

(65) Prior Publication Data

US 2005/0264266 A1  Dec. 1, 2005

(30) Foreign Application Priority Data

May 27, 2004 (JP) ............................. 2004-157529

(51) Int. Cl.
*H02M 7/00* (2006.01)
*H02M 5/42* (2006.01)

(52) U.S. Cl. ......................................... 363/67; 363/84

(58) Field of Classification Search .................. 363/65, 363/67, 69, 70, 78, 84, 89
See application file for complete search history.

(56) References Cited

U.S. PATENT DOCUMENTS

| | | | | |
|---|---|---|---|---|
| 4,751,629 A | * | 6/1988 | Shimizu et al. ............... | 363/37 |
| 4,797,800 A | * | 1/1989 | Simizu ......................... | 363/37 |
| 5,267,137 A | * | 11/1993 | Goebel ......................... | 363/87 |
| 5,406,470 A | * | 4/1995 | Ridley et al. .................. | 363/69 |
| 5,808,882 A | * | 9/1998 | Mochikawa .................. | 363/46 |
| 6,229,722 B1 | * | 5/2001 | Ichikawa et al. ............. | 363/71 |
| 6,256,213 B1 | * | 7/2001 | Illingworth ................... | 363/89 |
| 6,574,125 B1 | * | 6/2003 | Matsukawa et al. .......... | 363/71 |

FOREIGN PATENT DOCUMENTS

JP        2511843       7/1996

* cited by examiner

*Primary Examiner*—Adolf Berhane
(74) *Attorney, Agent, or Firm*—Westerman, Hattori, Daniels & Adrian, LLP.

(57) ABSTRACT

An abnormality of a generator provided with a plurality of power supply units is easily detected. Each of the power supply units includes each of output windings L1 to L4, which are wound independently of each other around the single iron core, and each of rectifier circuits 2 to 5. The power supply units produce an integrated output power. Control means 33 to 35 control the rectifier circuits such that an output voltage agrees with a target voltage Vref. In a case where an added up power W becomes a power target value Wref, when the added up current I further increases, a power comparing section 39 reduces the target voltage Vref to prevent the rectifier circuits from outputting power. Further, when the added up current I exceeds a current upper limit ILMT, a gate pulse is stopped.

2 Claims, 4 Drawing Sheets

GENERATOR

BACKGROUND OF THE INVENTION

1. Field of the Invention

The present invention relates to a generator and, in particular, to a generator capable of outputting a comparatively large direct current and being appropriately protected in an overload range.

2. Description of the Related Art

A generator driven by an engine or the like has been conventionally widely employed as the power supply of an electric appliance especially used for outdoor works and for leisure-time activities. Further, in recent years, the uses of the generator are spreading also to the back-up power supply, that is, the so-called uninterruptible power supply (UPS) for computers and the like. When the generator of this kind is constructed as a generator for outputting a direct current, there is a tendency that the generator is required to be small in size and to be able to output a comparatively low voltage and a large current. In the generator required to output a large current like this, a larger size of wire for an output winding is needed and a higher level of consideration is required to be given also to a dielectric breakdown voltage between windings and a material for insulator.

Hence, the present applicant proposed a generator that could be reduced in the wire diameter of an output winding and could be reduced in the capacity of a power device (Japanese Utility Model Registration No. 2511843). In a device in accordance with this registered utility model, a plurality of power supply units independent of each other are formed, respectively, of a plurality of output windings that are wound independently of each other around the same iron core and thyristor bridge rectifier circuits connected to the plurality of output windings, and the outputs of the power supply units are connected in parallel, thereby being integrated into one output.

In the device disclosed in the above patent document, a plurality of power supply units that have a power generating source in common are connected in parallel. Hence, there is presented a problem that when an abnormality occurs in any one of the plurality of power supply units, it is not easy to find the occurrence of the abnormality by a detecting system on the output side of the generator.

SUMMARY OF THE INVENTION

The object of the present invention is to provide a generator capable of solving the above problem and being protected in an overload range with ease and with reliability.

A generator having the features of the present invention is defined in claim 1, it includes a plurality of power supply units which are independent respectively and each of which has one of a plurality of output windings that are wound independently of each other around a single iron core and each of which has a rectifier circuit including a rectifier device with control terminals connected to respective phases of one of the plurality of output windings, wherein the plurality of power supply units are connected in parallel so as to integrate their outputs into one output, voltage detecting means that detects an output voltage of each of the rectifier circuits, current detecting means that detects an output current from each of the rectifier circuits, control means that controls the rectifier circuits so as to make the output voltage converge at a target voltage, power judgment means that detects that an added up power computed from an added up value of the output currents of the respective rectifier circuits detected by the current detecting means and from the target voltage becomes a predetermined value of power; and target voltage reducing means that reduces the target voltage for a more increase in the added up current of the output currents when the power judgment means detects that the added up power becomes the predetermined value of power.

The generator having a second feature is further comprising over-current protecting means that stops outputs of the rectifier circuits when the added up value of the output currents becomes larger than a predetermined upper current limit, a backflow preventing diode that is disposed between at least one pair of output lines, into which outputs of the rectifier circuits are integrated, so as to short-circuit a current flowing backward from a load side when the load is connected in reverse polarity; and a fuse that is disposed between the diode and an output terminal of the integrated output line and allows the predetermined upper current limit.

According to the first characteristic, when the added up value of the output powers of a plurality of independent rectifier circuits becomes a predetermined power, it is considered that a more increase in the added up value of the output current as over-power and hence a target voltage is reduced. Because the rectifier circuits are controlled such that the output voltage become a target voltage, the output voltages of the rectifier circuits are reduced with reduction of the target voltage, whereby the upper limit of the output power can be kept at a predetermined value. Therefore, it is possible to protect the generator with ease and with reliability even in an overload range where a large load current is required.

According to the second characteristic, even in the event that a load such as a battery is connected in reverse polarity to an output terminal, a short-circuit current is passed through the integrated output line by a backflow preventing diode to blow a fuse, whereby the short-circuit current is interrupted. Therefore, it is possible to prevent a short-circuit current from a load side from passing through the devices and the wirings on the rectifier circuit side which are set at smaller allowable current than the output line. Further, because the output current from the rectifier circuit side is interrupted before the fuse is blown, it is possible to construct the generator such that an expensive fuse is blown only when a load is connected in reverse polarity.

In this manner, according to the present invention, it is possible to keep the output power constant and to protect the rectifier circuits from over-current and the reverse connection of the load with ease and with reliability.

DETAILED DESCRIPTION OF THE PREFERRED EMBODIMENTS

Figure 1:
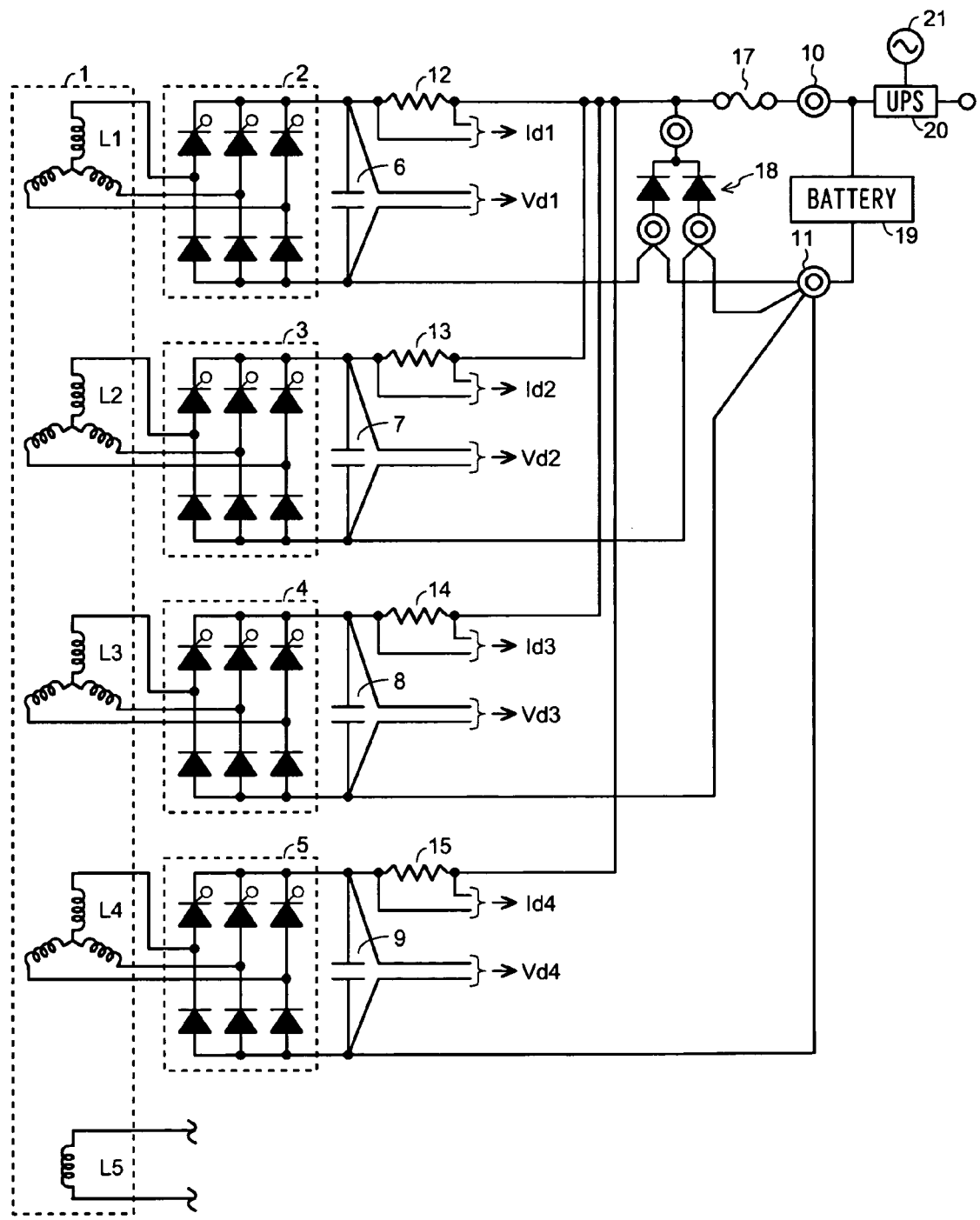
FIG. 1 is a connection diagram (No. 1) relating to the main portion of a generator in accordance with an embodiment of the present invention.

An embodiment of the present invention will be described below in detail with reference to the drawings. FIG. 1 is a construction diagram of the main portion of a portable generator in accordance with an embodiment of the present invention. In FIG. 1, the stator 1 of a generator body consists of four output windings L1, L2, L3, and L4 those are independent of each other and an auxiliary winding L5 independent of these output windings L1 to L4, wherein the four output windings L1, L2, L3, and L4 and the auxiliary winding L5 are wound around the protruding poles of a single stator iron core (not shown). The output windings L1 to L4 are equal to each other in the number of windings and in the diameter of the wire, that is, identical in specifications.

The stator 1 is disposed in the center of the generator body and a rotor having a plurality of magnets disposed annularly, that is, an outer rotor is commonly arranged on the outer periphery of the stator 1. The rotor is connected to a driving unit (that is here thought to be an engine) and is driven by the engine so as to rotate along the outer periphery of the stator 1.

The output windings L1, L2, L3, and L4 are connected to three-phase rectifier bridge circuits 2, 3, 4, and 5, respectively, each of which is constructed of rectifier devices having control terminals (thyristors) and diodes. Symbols showing the thyristors and the diodes in the drawing are well known and hence are not denoted by reference numerals for the purpose of avoiding the drawings from being complicated. Smoothing capacitors 6, 7, 8, and 9 are provided on the outsides of the three-phase rectifier bridge circuits 2, 3, 4, and 5, respectively. The plus-side output lines of the three-phase rectifier bridge circuits 2, 3, 4, and 5 are integrated into one line and connected to a plus-side output terminal 10 and the minus-side output lines thereof are integrated into one line and connected to a minus-side output terminal 11.

Shunts 12, 13, 14, and 15 are connected to the respective plus-side output lines before the plus-side output lines are integrated into one line. A potential difference across both ends of each of the shunts 12, 13, 14, and 15 is inputted as a signal showing each of output currents Id1, Id2, Id3, and Id4 of the three-phase rectifier circuits 2, 3, 4, and 5 to a microcomputer, that is, a controller 16 (see FIG. 2). A potential difference across both ends of each of the capacitors 6, 7, 8, and 9 is inputted as each of output voltages Vd1, Vd2, Vd3, and Vd4 of the three-phase rectifier circuits 2, 3, 4, and 5 to the controller 16.

A fuse 17 is provided in a line into which the respective plus-side output lines are integrated. The fuse 17 is selected so as to allow the maximum value of the added value of the respective output currents of the three-phase rectifier bridge circuits 2, 3, 4, and 5. A diode 18 is interposed between the upstream side of the fuse 17 of the one line, into which the plus-side output lines are integrated, and at least one line (two lines in the example shown in FIG. 1) of the four minus-side output lines. For example, when a battery 19 of a load is connected in reverse polarity by mistake, a current from a load side passes through one line, into which the output lines are integrated, via this diode 18. Hence, this can prevent a current from passing from a load connected in reverse polarity to the respective three-phase rectifier bridge circuits 2 to 5 having a smaller allowable current than this output lines.

The battery 19 and a UPS 20 are connected to the output terminal 10 on the plus side and the output terminal 11 on the minus side. The output side of the UPS 20 is connected to an electronic unit (not shown), for example, a computer system. A commercial AC power supply 21, for example, is connected to the UPS 20 and the battery 19 is always charged with this commercial AC power supply 21. The portable generator of the present embodiment is connected to the UPS 20 to supply the UPS 20 and the battery 19 with power in the event of a failure of the commercial AC power supply 21 or the like. Batteries of different rated voltages of 48 V and 36 V, for example, can be selectively connected as the battery 19.

Figure 2:
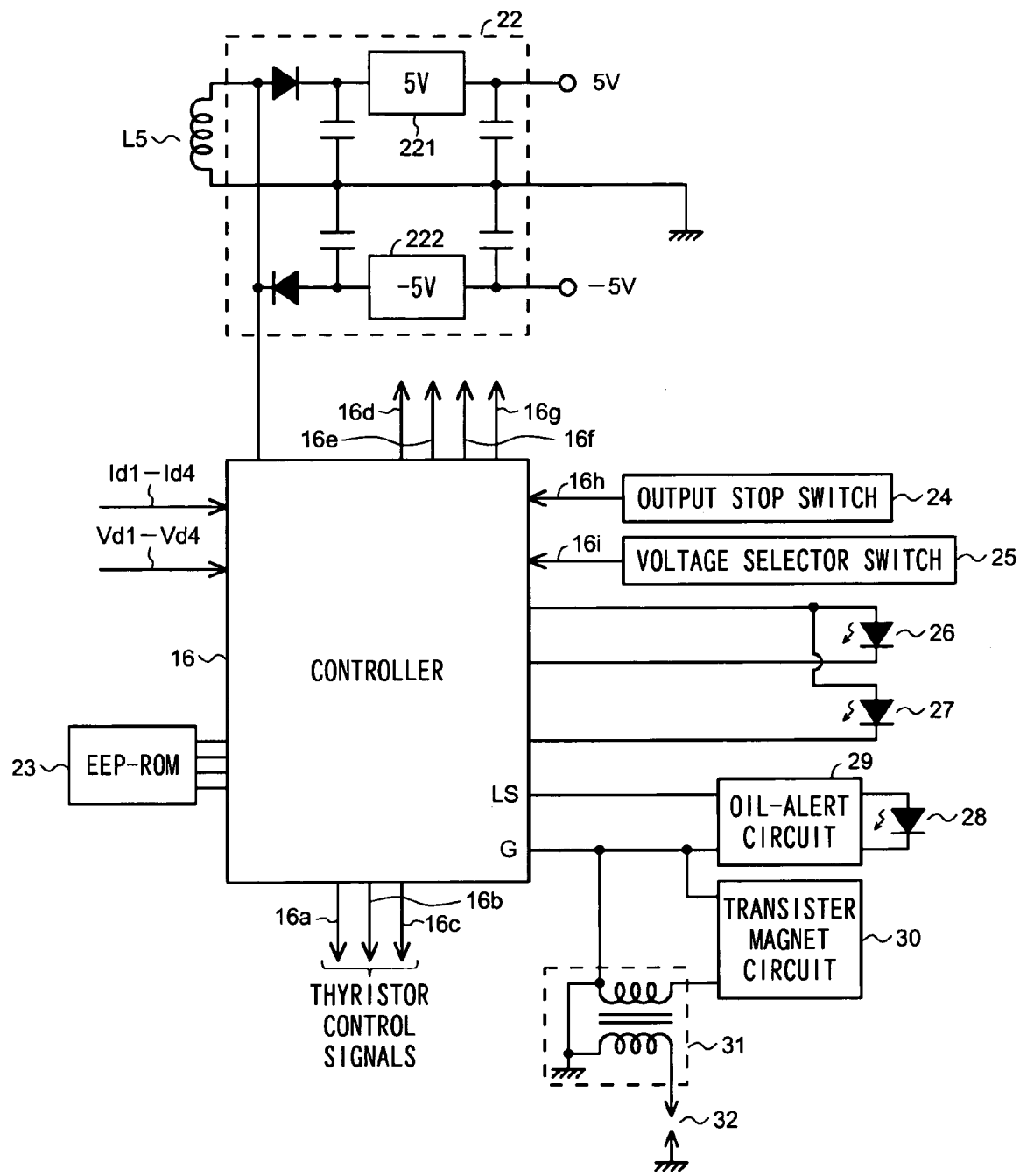
FIG. 2 is a connection diagram (No. 2) relating to the main portion of the generator in accordance with the embodiment of the present invention.

FIG. 2 is a connection diagram of a controller and its peripheral parts. The auxiliary winding L5 is connected to a constant-voltage circuit 22. The constant-voltage circuit 22 includes positive/negative (+5 V and −5 V) regulators 221, 222 with three terminals and generates DC power supply voltages stabilized at +5 V and −5 V by the voltage applied by the auxiliary winding L5. This DC power supply voltages are used as the power supply of the controller 16. Moreover, the output waveform of the auxiliary winding L5 is supplied as a signal for detecting the rotation of the rotor of the generator body to the controller 16. An EEP-ROM 23 for storing data used by the controller 16 is connected to the controller 16.

The controller 16 outputs thyristor control signals (gate pulses) 16a, 16b, and 16c for turning on and off the respective thyristors of each of the three-phase rectifier bridge circuits 2, 3, 4, and 5, as shown in FIG. 1. These gate pulses 16a, 16b, and 16c are supplied to the gate terminals, that is, the control terminals of the respective thyristors. Each of the three-phase rectifier bridge circuits 2, 3, 4, and 5 is provided with three thyristors corresponding to the respective phases U, V, and W of each of the output windings L1 to L4, and the thyristors corresponding to the respective phases are controlled by these gate pulses 16a, 16b, and 16c common to the three-phase rectifier bridge circuits 2, 3, 4, and 5. Hence, the three-phase rectifier bridge circuits 2, 3, 4, and 5 are controlled in synchronization with each other by the gate pluses 16a, 16b, and 16c.

To control the opening or closing of the throttle valve of the engine for driving the outer rotor by a stepping motor (not shown), the controller 16 outputs motor driving signals 16d, 16e, 16f, and 16g to this stepping motor.

An output stop switch 24 is a switch for stopping the portable generator in this embodiment from outputting generated power. When this output stop switch 24 is held pressed for a predetermined time, the gate pulses 16a, 16b, and 16c are stopped by the ON signal 16h of this switch 24, whereby the outputting of power is stopped. However, only the outputting of the generated power is stopped by this operation of the output stop switch 24 and the engine is not stopped only by the operation of this output stop switch 24.

A voltage selector switch 25 is a switch for setting an output voltage according to a connected load (battery 19 or the like). For example, when the voltage selector switch 25 is turned ON (selecting signal 16i is ON), a voltage of 36 V is set as an output voltage, and when the voltage selector switch 25 is turned OFF (selecting signal 16i is OFF), a voltage of 48 V is set as an output voltage.

There are provided an output indicating light 26, an overload indicating light 27, and an oil-alert indicating light 28. The oil-alert indicating light 28 is connected to the controller 16 through an oil-alert circuit 29. The output indicating light 26 is turned on while power is generated and outputted. The overload indicating light 27 is turned on in the case of an overload, that is, in the case of an over-current or an over-voltage.

There is provided a circuit section 30 of a transistor type magnet ignition unit. A well-known unit can be used as the main portion of the transistor type magnet ignition unit. The grounding line of the circuit section 30 of a transistor type magnet ignition unit and the grounding line of the oil-alert circuit 29 are connected to the terminal G of the controller 16. The other line of the circuit section 30 is connected to the coil part 31 of the ignition unit. An ignition plug 32 is connected to the secondary side of the coil part 31. The other terminal of the oil-alert circuit 29 is connected to the terminal LS of the controller 16. The terminals G and LS of the controller 16 are constructed to be short-circuited in the controller 16 so as to stop ignition.

The operation of the generator body will be described. The generator is started by the use of a recoil starter coupled to the engine of the driving source of the generator. When the recoil starter is pulled, the crankshaft of the engine is rotated and hence the rotor coupled to the crankshaft is rotated to develop a voltage in the auxiliary winding L5, and this voltage develops a predetermined voltage in the constant-voltage circuit 22. When the controller 16 has this voltage applied thereto, the controller 16 can start a controlling operation.

When the engine is rotated by the recoil starter, the engine is ignited by the ignition unit, whereby the generator is started. The windings L1 to L4 and L5 of the generator start generating power and the generated powers are integrated and outputted as generated power from the output terminals 10, 11. This power is supplied to the battery 19 and the UPS 20.

When the generated power is outputted, the output indicating light 26 is energized. Further, in the event of an over-current or an over-voltage, the overload indicating light 27 is energized. Still further, when it is determined by a well-known method that the oil of the engine is decreased to a level lower than a predetermined required value, the oil-alert circuit 29 is operated to energize the oil-alert indicating light 28. For example, the oil-alert circuit 29 is a switching circuit constructed such that a current passes through the oil-alert indicating light 28 according to a signal from the terminal LS. Further, when the oil decreases or an abnormality occurs in the power generating system, which will be described later, the controller 16 short-circuits the terminals LS and G in the controller 16 to stop igniting.

In this embodiment, the outputs of four power generating sections (power supply units) each including the windings and the rectifier circuit are integrated, that is, superimposed to the final output. When an abnormality occurs in the individual power supply units, the abnormality can be coped with in the following manner.

Figure 3:
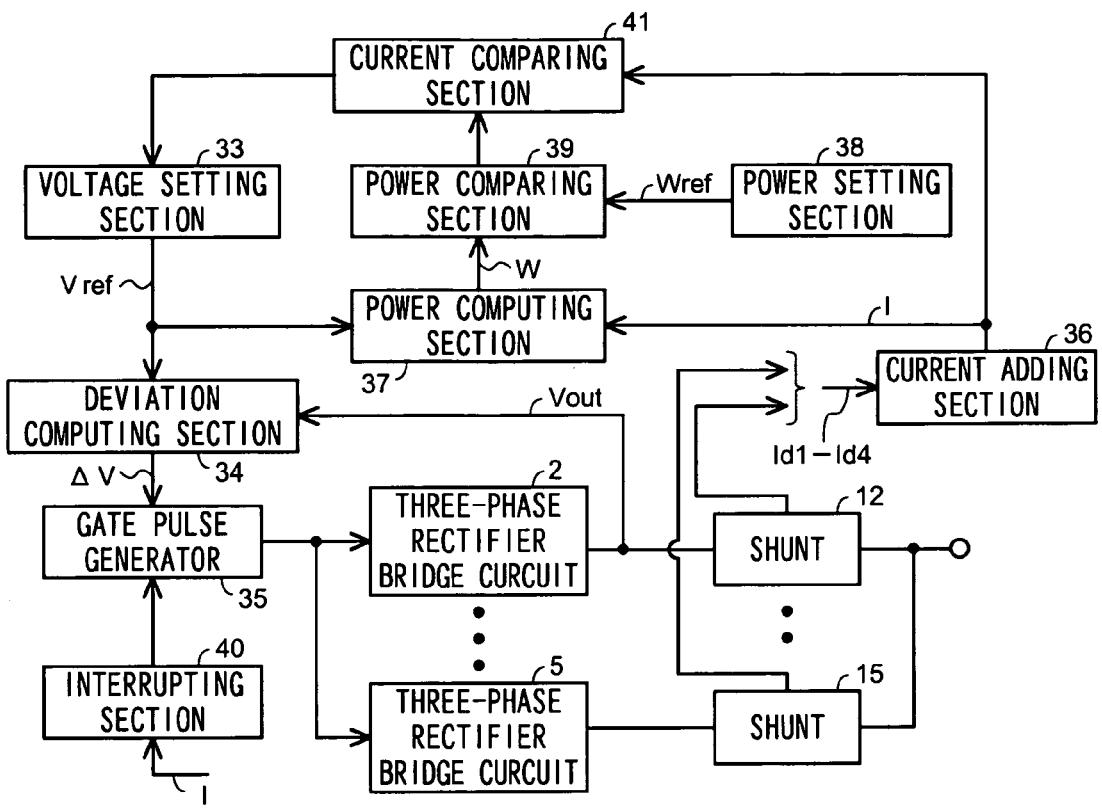
FIG. 3 is a block diagram showing the main function of a control section of the generator in accordance with the embodiment of the present invention.

FIG. 3 is a block diagram showing the function of the controller 16 to cope with the abnormality. In a voltage setting section 33, a target value Vref of the output voltage Vout of the generator (voltage across the terminals 10 and 11) is previously set and stored. The target value Vref is switched according to the selection of the voltage selector switch 25. A deviation computing section 34 computes a deviation ΔV of the output voltage Vout of the generator with respect to the target value Vref inputted by the voltage setting section 33. The output voltage Vout can be typified by any one of the voltages Vd1, Vd2, Vd3, and Vd4. The computed deviation ΔV is inputted to a gate pulse generator 35. The gate pulse generator 35 has a proportion control function of determining a gain proportional to this deviation ΔV so as to cancel the deviation ΔV. The gate pulse generator 35 determines the conduction angle of the thyristor according to this gain and produces a gate pulse corresponding to this conduction angle. This gate pulse is supplied to the three-phase bridge circuits 2, 3, 4, and 5, whereby the thyristors of the three-phase bridge circuits 2, 3, 4, and 5 are controlled at the same time.

A current adding section 36 adds up output currents Id1, Id2, Id3, and Id4 detected by the shunts 12, 13, 14, and 15 of the three-phase rectifier bridge circuits 2, 3, 4, and 5. A power computing section 37 computes an output power W by the added up current I and the target value Vref of the output voltage. A power upper limit target value Wref is previously set in a power setting section 38. A power comparing section 39 compares the computed output power W with the power upper limit target value Wref and reads an added up current value when the computed output power W reaches the power upper limit target value Wref in a current comparing section 41. When an added up current exceeding the read added up current value is detected, it is considered as an over-current and hence a command of reducing a voltage target value Vref is outputted to a voltage setting section 33. The target value Vref of the voltage setting section 33 is reduced in response to this command of reducing a voltage target value Vref. A range of reduction in the voltage target value Vref is previously set. With this, the gate pulse is changed so as to reduce a conduction angle of the thyristor and the output power is kept in a state where it does not exceed the power upper limit target value Wref.

Further, when the current I added up by the current adding section 36 becomes larger than a current upper limit ILMT, an interrupting section 40 stops the three phase rectifier bridge circuits 2, 3, 4, and 5 of their output, in other words, stops a gate pulse generator 35 from outputting the a thyristor control signal (=gate pulse).

Figure 4:
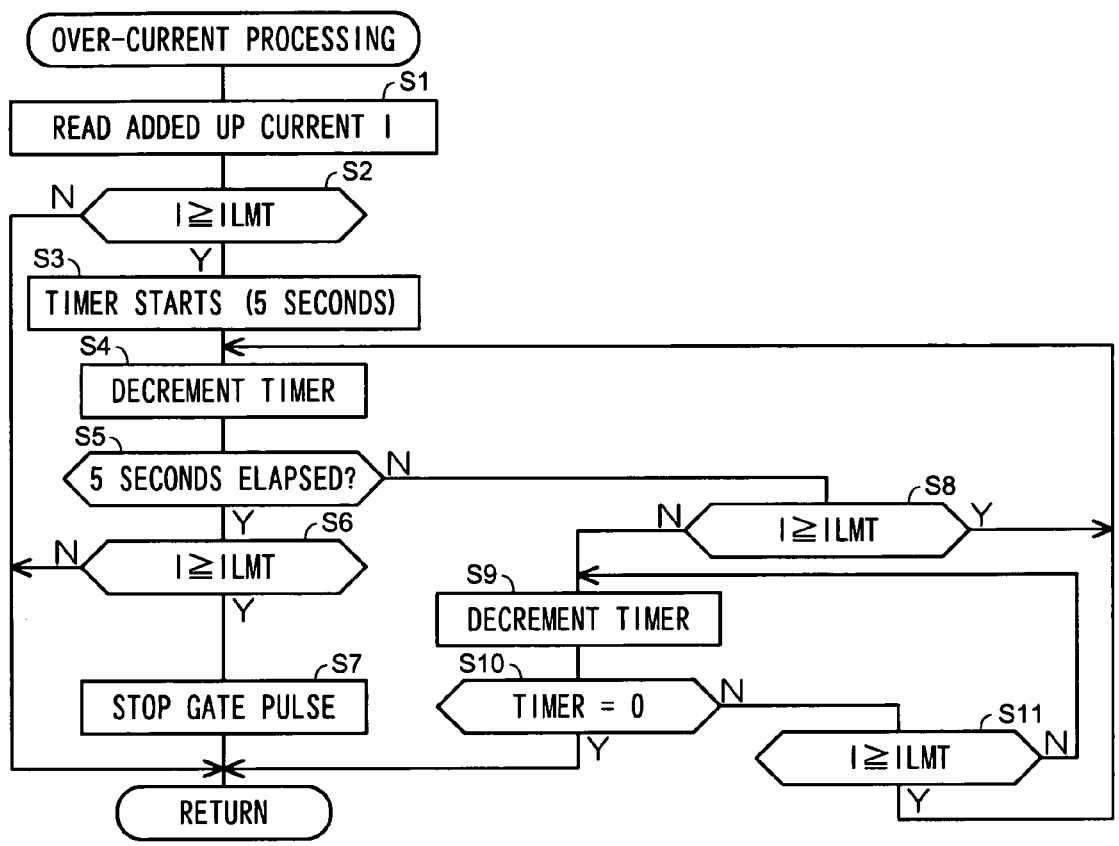
FIG. 4 is a flow chart of a process for over-current.

FIG. 4 is a flow chart showing an output stop processing to an over-current. In the drawing, at step S1, an added up current I is read. At step S2, it is determined whether or not the added up current I is not less than a current upper limit ILMT. It is assumed that the current upper limit ILMT is, for example, 80 ampere. If the determination result at step S2 is affirmative, the routine proceeds to step S3 where a timer is initialized. This timer is set such that time is up in five seconds. At step S4, the timer is incremented. At step S5, it is determined whether or not time is up (five seconds are passed). When time is up, the routine proceeds to step S6 where it is also determined whether or not the added up current I is not less than the current upper limit ILMT. If the determination result at step S6 is affirmative, the routine proceeds to step S7 where the outputting of the gate pulse is stopped. If the determination result at step S2 or step S6 is negative, the routine does not proceed to step S7 but the supply of the gate pulse is kept.

If the determination result at step S5 is negative, that is, until time is up in the timer set for 5 seconds, the routine proceeds to step S8. At step S8, just as step S6, it is determined whether or not the added up current I is not less than the current upper limit ILMT. That is, until time set for the timer passes, it is continuously determined whether or not the added up current I not less than the current upper limit ILMT. If the determination result at step S8 is affirmative, the routine returns to step S4 where the timer is incremented. At step S5, it is determined on the basis of the updated value of the timer whether or not a predetermined time passes.

If the determination result at step S8 is negative, that is, the added up current I is smaller than the current upper limit ILMT, the routine proceeds to step S9 where the timer is decremented and then the routine proceeds to step S10. At step S10, it is determined whether or not the timer returns to "0".

If the timer does not return to "0", the routine proceeds from step S10 to step S11 where it is determined whether or not the added up current I is not less than the current upper limit ILMT. If the determination result at step S11 is affirmative, the routine returns to step S4 where the timer is incremented. Then, the routine proceeds to step S5 where it is determined whether or not a predetermined time passes on the basis of the updated time of the timer.

If the determination result at step S11 is negative, the routine proceeds to step S9. The timer is decremented at step S9. Then, if determination result at step S10 becomes affirmative, that is, if the updated time of the timer returns to "0" as the added up current I remains smaller than the current upper limit ILMT, the processing of this flow chart is finished and the routine returns to a main routine.

When the supply of the gate pulse to the three-phase rectifier bridge circuits 2 to 5 is stopped at step S7, the overload indicating light 27 flashes to indicate an abnormality. The portable generator is constructed such that once the generator stops outputting power, the generator can output power only by once stopping the engine of the generator and then restarting the engine.

Figure 5:
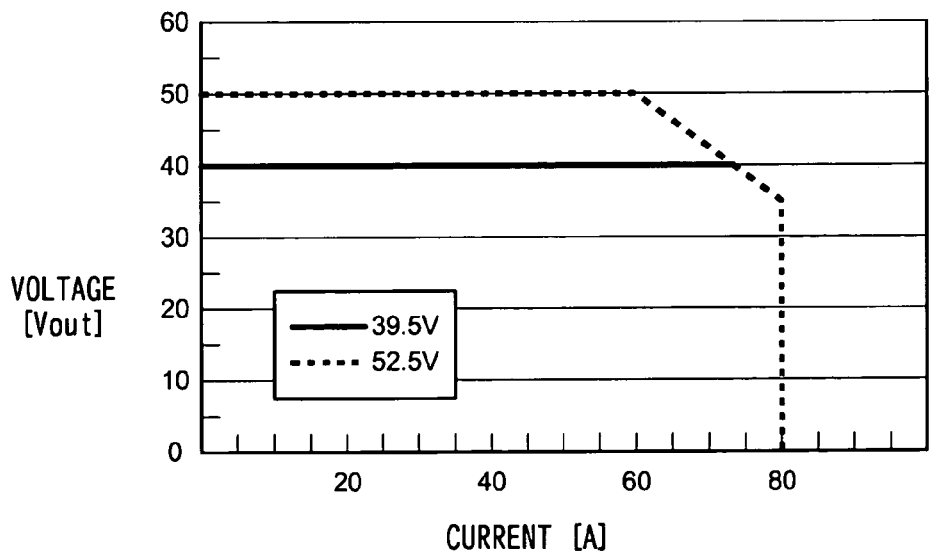
FIG. 5 is a graph showing the output characteristic of the generator of the embodiment of the present invention.

FIG. 5 is a graph showing the output characteristics of the portable generator in accordance with this embodiment controlled in the manner described above. In this embodiment, the portable generator is operated at rated power such that two steps of output voltages (52.5 volt and 39.5 volt) can be produced according to load and the output voltage and the output current are controlled such that the maximum power does not exceed 3 kilowatt. That is, when the output current I is smaller than 60 ampere, the output voltage Vout is kept at 52.5 volt or 39.5 volt according to a load. In a region where the output current I is larger than 60 ampere (a region where the output current I is larger than 70 ampere when the output voltage is set at 39.5 volt), the output voltage Vout is reduced according to an increase in the output current I to prevent the output power from becoming larger than 3 kilowatt. Then, when the output current I becomes 80 ampere, the outputting of power is stopped. That is, the output voltage Vout is reduced to zero.

What is claimed is:

1. A generator comprising:
   a plurality of power supply units which are independent respectively and each of which has one of a plurality of output windings that are wound independently of each other around a single iron core and each of which has a rectifier circuit including a rectifier device with control terminals connected to respective phases of one of the plurality of output windings, wherein the plurality of power supply units are connected in parallel so as to integrate their outputs into one output;
   voltage detecting means that detects an output voltage of each of the rectifier circuits;
   current detecting means that detects an output current from each of the rectifier circuits;
   control means that controls the rectifier circuits so as to make the output voltage converge at a target voltage;
   power judgment means that detects that an added up power computed from an added up value of the output currents of the respective rectifier circuits detected by the current detecting means and from the target voltage becomes a predetermined value of power; and
   target voltage reducing means that reduces the target voltage for a more increase in the added up current of the output currents when the power judgment means detects that the added up power becomes the predetermined value of power.

2. The generator as claimed in claim 1, further comprising:
   over-current protecting means that stops outputs of the rectifier circuits when the added up value of the output currents becomes larger than a predetermined upper current limit;
   a backflow preventing diode that is disposed between at least one pair of output lines, into which outputs of the rectifier circuits are integrated, so as to short-circuit a current flowing backward from a load side when the load is connected in reverse polarity; and
   a fuse that is disposed between the diode and an output terminal of the integrated output line and allows the predetermined upper current limit.

* * * * *